United States Patent [19]
Sexsmith

[11] Patent Number: 5,907,015
[45] Date of Patent: May 25, 1999

[54] AQUEOUS SILANE ADHESIVE COMPOSITIONS

[75] Inventor: Frederick H. Sexsmith, Erie, Pa.

[73] Assignee: Lord Corporation, Cary, N.C.

[21] Appl. No.: 08/776,966

[22] PCT Filed: Jul. 27, 1995

[86] PCT No.: PCT/US95/09700

§ 371 Date: May 1, 1997

§ 102(e) Date: May 1, 1997

[87] PCT Pub. No.: WO96/04339

PCT Pub. Date: Feb. 15, 1996

Related U.S. Application Data

[63] Continuation-in-part of application No. 08/284,829, Aug. 2, 1994, abandoned.

[51] Int. Cl.$^6$ .............................. C08J 9/10; C08L 61/00; C08L 83/00; C08F 283/00

[52] U.S. Cl. ...................... 524/837; 524/588; 524/611; 524/841; 524/843; 525/475; 525/505; 525/502

[58] Field of Search ............................ 524/588, 611, 524/837, 841, 843; 525/475, 505, 502

[56] References Cited

U.S. PATENT DOCUMENTS

| | | | |
|---|---|---|---|
| 3,022,196 | 2/1962 | Jenkins et al. | 117/127 |
| 4,118,436 | 10/1978 | Craven | 260/826 |
| 4,618,389 | 10/1986 | Agodoa | 156/307.5 |
| 4,631,207 | 12/1986 | Price | 427/387 |
| 5,178,675 | 1/1993 | Sexsmith | 106/287.11 |
| 5,209,775 | 5/1993 | Bank et al. | 106/2 |
| 5,466,727 | 11/1995 | Hsieh | 523/421 |
| 5,468,317 | 11/1995 | Hsieh | 156/108 |
| 5,532,314 | 7/1996 | Sexsmith | 524/611 |
| 5,552,476 | 9/1996 | Halling | 524/837 |
| 5,654,360 | 8/1997 | Palasz | 524/521 |
| 5,714,532 | 2/1998 | Osterholtz et al. | 524/114 |

Primary Examiner—James C. Housel
Assistant Examiner—Rodney P. Swartz
Attorney, Agent, or Firm—Wayne W. Rupert

[57] ABSTRACT

An adhesive composition based on a combination of a water soluble amino silane and a normally water-immiscible alkenyl-functional silane wherein the latter is hydrolyzed in the presence of the former under specified conditions to form a stable, water-dilutable aqueous composition having marked bonding affinity between polymers and solid substrates.

26 Claims, No Drawings

AQUEOUS SILANE ADHESIVE COMPOSITIONS

This application is a 371 of PCT/US95/09700, filed Jul. 27, 1995, which is a continuation-in-part of U.S. application Ser. No. 08/284,829, filed Aug. 2, 1994 now abandoned.

FIELD OF THE INVENTION

The present invention relates to aqueous formulations that are useful for bonding elastomers to various inorganic substrates such as metals, ceramics, and glass. More specifically, the invention relates to novel aqueous adhesive compositions based on the combination of amino- and alkenyl-functional silanes which compositions are water-dilutable, do not require the presence of an organic solvent to form a stable and workable adhesive solution and are useful for bonding a variety of different elastomers.

BACKGROUND OF THE INVENTION

Numerous silane adhesive compositions have previously been developed for the purpose of bonding elastomeric materials, particularly silicone elastomer-based materials. Many of these silane adhesive compositions rely on various organo-functional silane compositions as the active bonding agent. Due to the highly organic nature of the organo-functional silane compounds, traditional silane adhesive compositions have relied on organic solvents in order to form a stable and workable solution. While some traditional silane adhesive compositions contain water in addition to an organic solvent, the organic solvent is required in order to form a stable composition.

One example of an organic solvent-based silane adhesive composition is described in U.S. Pat. No. 3,022,196 as being a mixture of an unsaturated silane and an aminoalkyl silane. For utilization as an adhesive, the mixture is prepared as a solution in the presence of a water-miscible organic solvent. The adhesive composition may also contain a small amount of water in addition to the water-miscible organic solvent; however, the water-miscible organic solvent in such case predominates.

Another example of an organic solvent-based silane adhesive composition is described in U.S. Pat. No. 4,618,389 as being a mixture of an alkenyltrihydrocarbonoxy silane, a water-miscible solvent, and water.

In light of the continuing effort to eliminate volatile organic solvents from all chemical formulations for environmental purposes, a need presently exists for an aqueous silane adhesive composition which is largely free of any volatile organic solvent and which is stable and dilutable with water.

SUMMARY OF THE INVENTION

The present invention relates to an aqueous adhesive composition comprising an amino silane, an alkenyl-functional silane hydrolysate and water, having a slightly acid pH between 7 and 4, wherein the alkenyl-functional silane moiety is present in an amount from about 40 to about 70 mol % based on the total mols of silane and wherein the alkenyl-functional silane hydrolysate is formed in situ in the presence of said amino silane.

It has been unexpectedly discovered that the hydrolysis of a normally water-immiscible alkenyl-functional silane in the presence of the amino silane in the stated proportions and in essentially aqueous solution at the mildly acid conditions recited results in a stable aqueous solution which can be diluted further with water to form an unusually stable aqueous solution which, upon drying, possesses a marked ability for bonding various and different elastomeric polymers to substrates. Without being bound by any theory, it is presently believed that the amino silane under the stated conditions complexes or otherwise stabilizes the hydrolyzed alkenyl silane to prevent the latter from gelling or from precipitating from solution even upon further dilution with water. While an alcohol is formed as a reaction product during hydrolysis, its presence is incidental and is not required—in fact it can be removed by stripping—to provide a stable, water-dilutable solution.

DETAILED DESCRIPTION OF THE INVENTION

The amino silanes used in accordance with the present invention can be represented by the following formula:

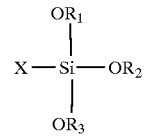

wherein X is an aminoalkyl group $NH_2R$— where R is an alkyl or alkyl amino alkyl group containing from 2 to about 10 carbon atoms, and $R_1$, $R_2$, and $R_3$ are the same or different alkyl or alkoxyalkyl groups having from about 1 to about 5 carbon atoms. Examples of X include aminoethyl, aminopropyl, aminobutyl, aminooctyl, aminodecyl, aminoethylaminopropyl ($NH_2CH_2CH_2NHCH_2CH_2CH_2$—), and the like, with aminopropyl and aminoethylaminopropyl being preferred. Examples of $R_1$, $R_2$, and $R_3$ include methyl, ethyl, propyl, methylethyoxy and ethylethyoxy, and the like. $R_1$, $R_2$ and $R_3$ are preferably alkyl or alkoxyalkyl groups having from about 1 to 3 carbon atoms with methyl, ethyl, and methoxyethyl being preferred. The preferred amino silanes of the present invention are aminopropyltriethoxy silane and aminoethylaminopropyltrimethoxy silane.

The normally water-immiscible alkenyl-functional silanes can be represented by the following formula:

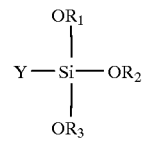

wherein Y is an alkenyl group having 2 to 4 carbon atoms or an alkenyloxy alkyl group having 3 to 6 carbon atoms, and $R_1$, $R_2$, and $R_3$ are the same or different alkyl groups having 1 to 3 carbon atoms. Examples of Y include vinyl, allyl, 1-butenyl, 2-butenyl, 1-isobutenyl, 2-isobutenyl, 1-sec-butenyl, 2-sec-butenyl, acryloxypropyl and gamma-methacryloxypropyl, with vinyl being preferred. $R_1$, $R_2$ and $R_3$ are preferably methyl or ethyl. The preferred alkenyl-functional silanes of the present invention are vinyltriethoxy silane and vinyltrimethoxy silane.

In order for the ingredients of the present adhesive composition to provide the desired bondability and remain stable in water, it has been found that the proportion of alkenyl-functional silane to amino silane must be such as to provide a mol % of the former of from about 40 to about 70% with respect to the total mols of both silanes. The preferred mol % of alkenyl-functional silane is from about 50 to about 60.

The slightly acid pH of the aqueous reaction (hydrolysis) medium may be provided by a water soluble acid. Examples of suitable acidic compounds useful in the present invention are nitric acid, formic acid, acetic acid, propionic acid, oxalic acid, fumaric acid, maleic acid, crotonic acid, acrylic acid, methacrylic acid, tartaric acid, and the like. Compounds that hydrolyze to acid form, like maleic anhydride, are included. It is presently preferred to utilize a weak volatile organic acid, especially glacial acetic acid, for ease of removal and minimum corrosion to metal substrates like steel and aluminum.

The acid will be utilized in an amount sufficient to provide the overall adhesive composition with a slightly acid pH between 7 and 4, preferably between 7 and 5.

The water utilized in preparing the compositions of the present invention can be derived from any conventional source and can be, for example, tap water. Deionized water is preferred. The amount of water utilized will be at least sufficient for hydrolysis. There should be at least 3 mols of water per mol of total silane—amino silane plus alkenyl-functional silane. While the amount of water may go up to about 100 mols thereof per mol of silane, the preferred amount is from about 5 to about 25 mols thereof per mol of silane. Of course, the composition can be further diluted before use with much higher amounts of water.

Initially, if any organic solvent is present, the water will still predominate. Preferably the mixture initially is substantially devoid of any organic solvent. During hydrolysis of the alkenyl-functional silane by-product alcohol, e.g. methyl or ethyl alcohol, will be formed and water will be consumed. In any case, however, the amount of water employed will be such that water will be present in the resulting composition, and the composition will be substantially devoid of any organic solvent beyond the alcohol generated during hydrolysis. It is this reliance on water as the solvent, along with the proportions of silanes and mildly acid pH conditions, that results in a valuable adhesive in the form of a stable aqueous solution that can be diluted with water without precipitation.

In connection with the generation of alcohol during hydrolysis as discussed above, it may be desirable to strip the resulting composition by distillation under reduced pressure to minimize organic compound, e.g. alcohol, emissions when the adhesive composition is used.

The adhesive compositions of the present invention can optionally contain well-known additives including plasticizers, fillers, pigments, reinforcing agents, and the like, in amounts employed by those skilled in the adhesive arts to obtain the desired color and consistency. Typical optional additives include titanium dioxide, carbon black, and zinc oxide.

The present adhesive compositions are typically prepared by mixing the amino silane, alkenyl-functional silane, acid and water and agitating the combination of ingredients in a conventional manner. The amount of mixing or shaking required for an individual formulation may vary but, in all cases, a sufficient amount of agitation should be employed so as to ensure that all of the ingredients have entered into a single aqueous phase. The temperature of the reaction mixture may range from about 20 to about 100° C., preferably from about 25 to about 60° C.

The reaction is exothermic. The exotherm may be more easily controlled by either adding the water-acid mixture progressively to the pre-mixed silanes or by progressively adding the alkenyl-functional silane to the pre-mixed acid, water and amino silane.

The material which may be bonded to a surface such as metal, ceramic or glass with the adhesive compositions of the present invention, is preferably a polymeric material, including any elastomeric material selected from any of the natural rubbers and olefinic synthetic rubbers including polychloroprene, polybutadiene, neoprene, styrene-butadiene rubber, butyl rubber, brominated butyl rubber, nitrile butadiene rubber, and the like. It has been discovered that the adhesive compositions of the present invention have an unusual efficacy in adhering to vulcanizing specialty elastomers that are either peroxide-(free radically) or polyol (ionically) or diamine-cured. Such specialty elastomers include peroxide-cured silicone, fluorosilicone, fluorocarbon, polyphosphazene, and nitrile butadiene rubbers; polyol- and/or diamine-cured fluoroelastomers; and soap- or peroxide-cured polyacrylate elastomers. The hydrolyzed alkenyl-functional silane moiety is believed to be the active coupling agent for elastomers cured by peroxides, i.e. free radically. It is also believed that the two types of silane together form a complex and it is this complex that is the active coupling agent for either ionically or free radically cured specialty elastomers like polyol-cured fluoroelastomers such as VITON (DuPont) or FLUOREL (3M) crosslinked by bisphenol AF.

The surface to which the polymeric material is bonded can be any solid surface such as metal, ceramic, glass, fabric (like nylon fabric or braid), or plastic surface capable of receiving the adhesive and is preferably a metal surface selected from any of the common structural metals such as iron, steel (including stainless steel), lead, aluminum, copper, brass, bronze, titanium, Monel metal, nickel, zinc, phosphatized steel, and the like.

As stated above, the adhesive composition of the invention is preferably utilized to bond an elastomeric material to a metal surface. The composition may be applied to the metal surface by spraying, dipping, brushing, wiping or the like, after which the adhesive is permitted to dry. The coated metal surface and elastomeric material are then typically brought together under heat and pressure to complete the bonding procedure. The surface of the metal and the elastomeric material are normally brought together under a pressure of from about 20 to 170 Mega Pascals (MPa). The resulting rubber-metal assembly is simultaneously heated to a temperature of from about 100° C. to about 300° C., preferably from about 150° C. to 170° C. The assembly should remain under the applied pressure and temperature for a period of from about 3 minutes to about 60 minutes, depending on the cure rate and thickness of the elastomeric material. This process may be carried out by applying the elastomeric material as a semi-molten material to the metal surface as in, for example, an injection-molding process. The process may also be carried out by utilizing compression molding, transfer molding or autoclave curing techniques. The process may also involve a post-cure step as is known in the art. After the process is complete, the bond is fully vulcanized and ready for use in a final application.

Although the adhesive compositions of the present invention are preferred for bonding polyol- or peroxide-cured elastomers to metal, the present adhesive compositions may be applied as a primer to any surface of substrate capable of receiving the adhesive. Thus it is possible to overlay the formulations of this invention with covercoats to which the formulations will knit when exposed to heat. Such covercoats may be in the nature of protective coatings or other adhesives. The covercoat may embody chemistry which enables it to knit or bond to elastomers during vulcanization that are not themselves sufficiently bonded by the formulations of this invention. Because of its bonding affinity to metals the present adhesive may also serve as a protective coating on metals.

The following examples are provided for illustration only and are not intended to limit the scope of the invention which is defined by the claims.

EXAMPLE 1

The following mixture is prepared:
vinyltriethoxy silane 25 g
aminopropyltriethoxy silane 25 g
deionized water 40 g
glacial acetic acid 10 g
The vinyltriethoxy silane is 53.7 mol % of the total mols of silanes.

The mixture is placed in a jar, sealed, and continuously shaken at ambient temperature for 30 minutes. Heat is generated due in part to acetic acid neutralization of the basic amino group of the aminopropyltriethoxy silane and in part by ethoxy hydrolysis forming ethyl alcohol. The mixture forms a single phase, very slightly cloudy solution having a pH of 5.5. One part of this composition can be diluted with nine parts of deionized water. The diluted solution neither precipitates nor forms an emulsion or gel after several hours.

Several grams of the mixture are placed in an aluminum weighing dish and are allowed to dry in ambient laboratory atmosphere overnight. The residue comprises 35.4% of the weight of the starting sample. This amount of residue implies volatilization loss of alcohol that had been produced through hydrolysis.

EXAMPLE 2

The following mixtures are prepared:
a) aminopropyltriethoxy silane 50 g
   deionized water 40 g
   glacial acetic acid 10 g
b) vinyltriethoxy silane 50 g
   deionized water 40 g
   glacial acetic acid 10 g The ingredients of mixture (a) are immediately soluble one with another.

Mixture (b) has to be shaken intermittently for more than three hours before it becomes a single clear phase, assumed to be a solution in water of the hydrolyzed vinyl silane (vinyl trisilanol and its soluble siloxane condensation products).

When it is attempted to dilute one part of the presumably hydrolyzed (b) with 10 parts of deionized water, a copious amount of precipitated gel-like material forms.

Equal amounts of (a) and (b) (after shaking) are mixed and furnish a clear solution having a pH of 5.5. When this (a)–(b) mixture is diluted with 10 times its amount of deionized water, the resulting solution assumes a definite Tyndall Effect appearance and becomes increasingly cloudy with time.

This example illustrates the criticality of conducting the hydrolysis of the alkenyl silane in the presence of the amino silane in accordance with the present invention to provide a water-dilutable product.

EXAMPLE 3

The following mixture is prepared:
vinyl triethoxy silane 16.6 g
aminopropyltriethoxy silane 33.4 g
deionized water 40 g
glacial acetic acid 10 g After shaking for several minutes the mixture assumes the form of a single-phase, very slightly cloudy solution having a pH of 5.5 which is readily dilutable in excess water.

EXAMPLE 4

With 25 grams of vinyl triethoxy silane are mixed 25 grams of aminopropyl triethoxy silane. The resulting mixture is a clear colorless liquid. To this mixture is slowly added, over the course of 15–20 minutes, a solution of 10 grams of glacial acetic acid in 40 grams of deionized water. Slow addition of the dilute acid causes localized turbidity to form which rapidly dissipates with agitation. The final solution having a pH of 5.5 is very slightly turbid but is able to be diluted in excess water without precipitating, emulsifying, or gelling.

EXAMPLE 5

The following mixture is prepared:
aminopropyltriethoxy silane 25 g
vinyl triethoxy silane 25 g To this mixture is slowly added (over 10 minutes) a solution of 10 grams of maleic anhydride dissolved in 40 grams of deionized water. The final solution is very slightly turbid and has a pH of 5.25. It is able to be diluted in excess water without precipitating, emulsifying, or forming a gel.

Comparative Example 6

The following mixture is prepared:
vinyl triethoxy silane 33.3 g
aminopropyltriethoxy silane 16.7 g
deionized water 45.5 g
maleic anhydride 4.5 g The mixture contains vinyl triethoxy silane in an amount greater than that specified by the present invention and has a pH of 7.0. The mixture is placed in a closed container and shaken intermittently for one week. After that time it is still in two distinct liquid phases—a lower phase comprising (presumably) the amino silane and maleic anhydride or acid dissolved in water, and an upper phase comprising largely unchanged vinyl triethoxy silane.

EXAMPLE 7

A peroxide-curable silicone elastomer compound is prepared by mixing the following on a rubber roller mill.

| Product Name | Manufacturer | Parts by Weight |
| --- | --- | --- |
| BLENSIL SE44U | General Electric Co. | 25 parts by wt. |
| BLENSIL SE 88U | General Electric Co. | 75 parts by wt. |
| VAROX* | RT Vanderbilt Co. | 0.4 parts by wt. |

*VAROX is a 50% active powder, with 2,5-dimethyl 2,5-ditertiary butyl peroxy hexane as the active peroxide ingredient.

Zinc phosphatized steel coupons, phosphatized in a conventional manner, are dipped in an adhesive solution prepared by diluting 100 parts by weight of the adhesive composition of Example 1 with 733 parts by weight of deionized water.

Zinc phosphatized steel coupons, phosphatized in a conventional manner, are also dipped in a diluted adhesive solution prepared according to Example 3, diluted on the basis of 100 parts by weight of the Example 3 composition with 525 parts of deionized water.

The adhesive-coated metal coupons prepared above are used to prepare lap-shear test assemblies according to ASTM D 429-81, Method B.

The vulcanization cycle used to cure and bond 1/8" pads of the silicone elastomer to the adhesive-coated coupons is 15 minutes at 171° C. Testing of the bonded assemblies is carried out with a mechanical tester by peeling the elastomer away at a 45° angle and at a jaw speed of 20" per minute. Bond results are given below and a high percent of elastomer failure indicates that the adhesive bond is stronger than the elastomer itself. The pull value represents the amount of force required to separate the rubber from the metal.

| | |
|---|---|
| Diluted Adhesive of Example 1 | 22 lbs. pull value, 100% elastomer failure |
| Diluted Adhesive of Example 3 | 15 lbs. pull value, 7% elastomer failure, 93% elastomer-to-adhesive failure |

These results demonstrate that, for satisfactory bonding of a peroxide-curing silicone elastomer, the ratio of vinyl silane to amino silane in the cohydrolyzate is important.

EXAMPLE 8

With 25 grams of gamma-methacryloxypropyl trimethoxy silane are mixed 25 grams of aminopropyl triethoxy silane. The resulting mixture is a clear colorless liquid. To this mixture is slowly added, over the course of 15–20 minutes, a solution of 10 grams of glacial acetic acid in 40 grams of deionized water. Slow addition of the dilute acid causes local turbidity to form which rapidly dissipates with agitation. The final solution having a pH of 5.5 is very slightly turbid but is able to be diluted with excess water without precipitation, emulsifying or gelling.

EXAMPLE 9

A. Twenty-five parts, by weight, of vinyl trimethoxy silane are added to a mixture of 25 parts of aminopropyl triethoxy silane, 10 parts of glacial acetic acid and 40 parts of deionized water. The vinyl trimethoxy silane amounts to 59.9 mol % of the total mols of silane.

B. Another adhesive composition is prepared by adding 30 parts, by weight, of vinyl trimethoxy silane to a mixture of 23 parts of aminopropyl triethoxy silane, 10 parts of glacial acetic acid and 37 parts of deionized water. The vinyltrimethoxy silane amounts to 66 mol % of the total mols of silane.

Portions of adhesives A and B are diluted, respectively, with 4 and 6 parts, by weight, of deionized water per part of adhesive.

Pads of silicone elastomer ⅛" thick, as used in Example 7 are bonded to grit-blasted steel coupons coated with diluted adhesive and dried using a vulcanization cycle of 15 minutes at 171° C.

Bonding results are as follows:

| Adhesive | A | | B | |
|---|---|---|---|---|
| Dilution ratio | 4.0 | 6.0 | 4.0 | 6.0 |
| % Elastomer Failure | 100 | 100 | 100 | 100 |
| Peel strength (lbs) | 20 | 20 | 20 | 22 |

EXAMPLE 10

Portions of the adhesive composition of Example 1 are diluted with deionized water with 5.0, 7.8 and 15.0 parts, by weight, of deionized water, respectively, per part of adhesive. The resulting water-diluted adhesives are applied to zinc phosphatized steel coupons and dried. Pads ⅛" thick of the silicone elastomer used in Example 7 are bonded to the adhesive-coated steel coupons using a vulcanization cycle of 15 minutes at 171° C.

Bonding results are as follows:

| | | | |
|---|---|---|---|
| Dilution ratio | 5.0 | 7.8 | 15.0 |
| % Elastomer failure | 100 | 100 | 100 |
| Peel strength (lbs.) | 15 | 15 | 15 |

EXAMPLE 11

Three master solutions, designated I, II and III, are prepared as follows:

I from 28 parts, by weight, of vinyltrimethoxy silane, 22 parts of aminopropyltrimethoxy silane, 10 parts of glacial acetic acid and 40 parts of deionized water.

II from 11.7 parts of vinyltrimethoxy silane, 35 parts of aminopropyltrimethoxy silane, 14 parts of glacial acetic acid and 39.3 parts of deionized water.

III from 35 parts of aminopropyltriethoxy silane, 14 parts of glacial acetic acid and 51 parts of deionized water.

From these master solutions, compositions are made according to the following in parts by weight:

| | #1 | #2 | #3 | #4 | #5 | #6 | #7 |
|---|---|---|---|---|---|---|---|
| I | 20.8 | 13.9 | 6.9 | — | — | — | — |
| II | — | 8.4 | 16.9 | 25.3 | 16.9 | 8.4 | — |
| III | — | — | — | — | 12.6 | 25.3 | 38.0 |
| Deionized water | 79.2 | 77.7 | 76.2 | 74.7 | 70.5 | 66.3 | 62.0 |
| Mol % Vinyl Silane | 65.5 | 54.8 | 44.0 | 33.3 | 22.2 | 11.0 | 0 |

Each composition is tested for bonding a fluoroelastomer, believed to be compounded with bisphenol AF cross-linking agent and with a quaternary phosphonium catalyst (3M's FLUOREL brand of FKM) and further compounded with 9 parts of magnesium oxide and 18 parts of calcium hydroxide per 390 parts of masterbatch, to zinc phosphatized steel coupons.

Pads of the elastomer ¼" thick are bonded to the adhesive-coated steel coupons at a vulcanization cycle of 10 minutes at 171° C.

Bonding results are as follows:

| | #1 | #2 | #3 | #4 | #5 | #6 | #7 |
|---|---|---|---|---|---|---|---|
| % Elastomer Failure | 90 | 94 | 99 | 35 | 15 | 15 | 15 |
| Peel Strength (lbs) | 88 | 94 | 90 | 70 | 58 | 52 | 32 |

EXAMPLE 12

The adhesive composition of Example 1, diluted with 4 parts of deionized water per part of adhesive composition, is used for bonding a peroxide-cured copolymer of tetrafluoroethylene and propylene (AFLAS FA-1005 elastomer stack manufactured by 3M Company). The water-diluted adhesive is applied to zinc phosphatized steel coupons and dried. Pads of the elastomer ⅛" thick are bonded to the adhesive-coated steel coupons with a vulcanization cycle of 5 minutes at 177° C. followed by a post-cure of 12 hours at 205° C.

EXAMPLE 13

Adhesive compositions are prepared from aminoethylaminopropyltrimethoxy silane ("A.S.") and vinyltrimethoxy silane ("V.S.") in varying proportions, in parts by weight, as set forth in the following table. Each composition is then diluted with deionized water at a 3:1 dilution ratio. The water-diluted adhesives are applied to zinc phosphatized steel coupons by dip coating and dried.

Pads of the fluoroelastomer as used in Example 11 are bonded to the coated steel coupons using a vulcanization cycle of 10 minutes at 171° C. The results are as follows:

|  | #1 | #2 | #3 | #4 |
| --- | --- | --- | --- | --- |
| "A. S." | 27.1 | 25.1 | 22.7 | 20.7 |
| "V. S." | 18.1 | 19.5 | 21.0 | 22.4 |
| Deionized Water | 38.6 | 40.4 | 42.7 | 44.5 |
| Glacial Acetic Acid | 16.2 | 15.0 | 13.6 | 12.4 |
| Mol % "V. S." | 50.0 | 53.7 | 58.0 | 62.0 |
| % Elastomer failure | 95 | 94 | 93 | 90 |
| Peel strength (lbs) | 97 | 96 | 92 | 99 |

Modification is possible in the selection of specific ingredients in the preparation of the composition of the present as well as in the exact procedure used in the preparation and use of the composition without departing from the scope of the claims.

I claim:

1. The method of preparing an aqueous solution of an adhesive for bonding polymeric material which comprises mixing a normally water-immiscible alkenyl-functional silane and a water-soluble amino silane in a proportion of from about 40 to about 70 mol % of the former based on the total mols of silane in water at a slightly acid pH between 7 and 4 and in the substantial absence of an organic solvent and hydrolyzing said alkenyl-functional silane in the presence of said amino silane.

2. The method of claim 1 wherein said amino silane has the structural formula

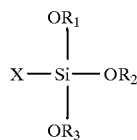

wherein X is an aminoalkyl group $NH_2R$— where R is an alkyl or alkylaminoalkyl group containing from 2 to about 10 carbon atoms, and wherein $R_1$, $R_2$ and $R_3$ are the same or different alkyl or alkoxyalkyl groups having from 1 to 5 carbon atoms.

3. The method of claim 2 wherein X is $NH_2CH_2CH_2CH_2$— or $NH_2CH_2CH_2NHCH_2CH_2CH_2$—.

4. The method of claim 2 wherein $R_1$, $R_2$ and $R_3$ are methyl, ethyl or methoxyethyl.

5. The method of claim 1 wherein the alkenyl-functional silane has the formula:

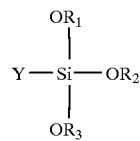

wherein Y is an alkenyl group having 2 to 4 carbon atoms or an alkenyloxy alkyl group having 3 to 6 carbon atoms, and $R_1$, $R_2$ and $R_3$ are the same or different alkyl groups having from 1 to 3 carbon atoms.

6. The method of claim 5 wherein Y is vinyl.

7. The method of claim 5 wherein $R_1$, $R_2$ and $R_3$ are methyl or ethyl.

8. The method of any of claims 1–7 wherein the proportion of alkenyl-functional silane is from about 50 to about 60 mol %.

9. The method of any of claims 1–7 wherein the amount of water is from about 3 to about 100 mols thereof per mol of total silane.

10. The method of any of claims 1–7 wherein the amount of water is from about 5 to about 25 mols thereof per mol of total silane.

11. An aqueous, water dilutable adhesive composition comprising an amino silane, an alkenyl-functional silane hydrolysate and water having a slightly acid pH between 7 and 4, wherein the alkenyl-functional silane moiety is present in an amount from about 40 to about 70 mol % based on the total mols of silane and wherein the alkenyl-functional silane hydrolysate is formed in situ in the presence of said amino silane.

12. The adhesive of claim 11 wherein the amino silane has the structural formula

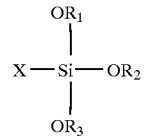

wherein X is an aminoalkyl group $NH_2R$— where R is an alkyl or amino alkyl group containing from 2 to about 10 carbon atoms, and wherein $R_1$, $R_2$ and $R_3$ are the same or different alkyl or alkoxyalkyl groups having from 1 to 5 carbon atoms.

13. The adhesive of claim 12 wherein X is $NH_2CH_2CH_2CH_2$— or $NH_2CH_2CH_2NHCH_2CH_2CH_2$—.

14. The adhesive of claim 12 wherein $R_1$, $R_2$ and $R_3$ are methyl, ethyl or methoxyethyl.

15. The adhesive of claim 11 wherein the alkenyl silane has the formula

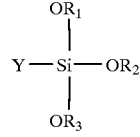

wherein Y is an alkenyl group having 2 to 4 carbon atoms or an alkenyloxy alkyl group having 3 to 6 carbon atoms, and $R_1$, $R_2$ and $R_3$ are the same or different alkyl groups having from 1 to 3 carbon atoms.

16. The adhesive of claim 15 wherein Y is vinyl.

17. The adhesive of claim 15 wherein $R_1$, $R_2$ and $R_3$ are methyl or ethyl.

18. The adhesive of any of claims 11–17 wherein the proportion of alkenyl-functional is from about 50 to about 60 mol %.

19. The adhesive of any of claims 11–17 wherein the composition is substantially devoid of any organic solvent beyond alcohol formed during hydrolysis.

20. The method of claim 1 further comprising mixing in an acidic-imparting compound selected from the group of maleic anhydride and acetic acid.

21. A method of preparing an aqueous solution of an adhesive for bonding polymeric material which comprises mixing a normally water-immiscible alkenyl-functional silane and a water-soluble amino silane in a proportion of from about 40 to about 70 mol % of the former based on the total mols of silane in water and in the substantial absence of an organic solvent and hydrolyzing the alkenyl-functional silane in the presence of the amino silane.

22. The method of claim 21 further comprising removing from the solution alcohol that is formed during the hydrolysis.

23. An aqueous, water dilutable adhesive composition comprising an amino silane, an alkenyl-functional silane hydrolysate and water, wherein the alkenyl-functional silane moiety is present in an amount from about 40 to about 70 mol% based on the total mols of silane and wherein the alkenyl-functional silane hydrolysate is formed in situ in the presence of said amino silane.

24. An adhesive of claim 23 wherein the adhesive is substantially free of organic solvents and alcohol.

25. The method of claim 1 further comprising removing from the solution alcohol that is formed during the hydrolysis.

26. The adhesive of claim 11 wherein the adhesive is substantially free of alcohol.

\* \* \* \* \*